US006623777B2

(12) United States Patent
Kawase et al.

(10) Patent No.: US 6,623,777 B2
(45) Date of Patent: Sep. 23, 2003

(54) MICROWAVE HEATABLE BREAD-BASED FAST FOOD

(75) Inventors: Katsunori Kawase, Nagareyama (JP); Seiki Harada, Zushi (JP)

(73) Assignee: Unucolloid, Inc., Kanagawa-Ken (JP)

( * ) Notice: Subject to any disclaimer, the term of this patent is extended or adjusted under 35 U.S.C. 154(b) by 0 days.

(21) Appl. No.: 10/101,280

(22) Filed: Mar. 20, 2002

(65) Prior Publication Data

US 2002/0136815 A1 Sep. 26, 2002

Related U.S. Application Data

(63) Continuation of application No. 09/722,640, filed on Nov. 28, 2000, now abandoned.

(30) Foreign Application Priority Data

Aug. 25, 2000 (JP) ........................................ 2000-255470

(51) Int. Cl.$^7$ ............................................... A21D 13/00
(52) U.S. Cl. .......................... 426/549; 426/19; 426/61; 426/62; 426/92; 426/94; 426/237; 426/243
(58) Field of Search ............................ 426/92, 94, 138, 426/549, 19, 61, 62, 237, 243

(56) References Cited

U.S. PATENT DOCUMENTS

| 4,165,386 A | 8/1979 | Kikuhara |
| 4,562,078 A | 12/1985 | Kizawa et al. |
| 6,126,982 A | 10/2000 | Maldonado |
| 6,149,953 A | 11/2000 | Redding, Jr. |
| 6,183,787 B1 | 2/2001 | Ishigaki et al. |

OTHER PUBLICATIONS

Professional Baking, 1985, pp. 12–13.

*Primary Examiner*—Lien Tran
(74) *Attorney, Agent, or Firm*—Millen, White, Zelano & Branigan, P.C.

(57) ABSTRACT

For use in the preparation of fast food product such as hot dogs or hamburgers, buns or rolls which are adapted for heating together with a cooked meat product inserted therein are produced from a dough containing hard white wheat flour as at least part of the starting wheat flour, rice koji and vitamin C. The dough contains a leaving effective amount of yeast and appropriate amounts of conventional additives such as sodium chloride, sugar, oil and fats, milk powder and the like. The dough is free from yeast food, potassium bromate and an emulsifier. The fast food products are packaged with a microwave heatable packaging material in a cooled or refrigerated or frozen state for storage or shipping.

7 Claims, No Drawings

MICROWAVE HEATABLE BREAD-BASED FAST FOOD

This application is a continuation of 09/722,640 filed Nov. 28, 2000, now abandoned.

BACKGROUND OF THE INVENTION

This invention relates to microwave heatable, bread-based fast food such as hot dogs, hamburgers and the like. It also relates to bread, dough and flour premix for preparing such bread-based fast food.

Bakery processes generally include dough making, leavening, shaping and baking steps. Dough is conventionally produced by blending wheat flour with yeast, yeast food or potassium bromate and other conventional additives such as sodium chloride, sugar, oil and fats, emulsifiers and milk powder, and kneading the blend with water. Bread-based fast food such as hot dogs or hamburgers remains tasteful while the bread is as hot as baked and the sausages or hamburger steaks are kept warm. Once cooled their unique taste and flavor will be significantly lost. Microwave heating of cold fast food of this kind cannot resume back their original taste and flavor because their bread parts are heated for an excessive period of time before inserted meat products reach an optimum temperature for eating. Excessive heating of the bread tends to shrink and create wrinkles on surfaces by partial destruction of the bread texture.

A need exist, therefore, for bread-based fast food containing a meat product which may be stored for a reasonal period of time and then heated with microwave radiation immediately before eating to resume back their original taste and flavor as much as possible. Such a product may be shipped in refrigerated or frozen state for providing tasteful fast food as freshly prepared by microwave heating.

SUMMARY OF THE INVENTION

As stated above, hot dogs, hamburgers and other fast food using rolls or buns produced from conventional dough materials are not suited for microwave heating. This is because the bread cannot withstand microwave heating until inserted meat products reach an optimum temperature for eating. The present invention overcomes or substantially alleviates this disadvantage by modifying dough formulations.

In one aspect, the present invention provides microwave heatable, bread-based fast food including inserted therein a meat product such as sausages or hamburger steaks. In accordance with the present invention, said bread is prepared by the conventional bakery process from a dough formulation comprising wheat flour, rice koji and vitamin C wherein at least a portion of the wheat flour is hard white wheat flour. The finished bread is combined with a meat product such as sausages or hamburger steaks and other accessories. The resulting product is wrapped with a microwave heatable packaging material and then shipped as such or after refrigerating or freezing. The product in a cold or frozen state may be heated at home or in restaurants or shops in a microwave heater for a sufficient period of time until the inserted meat products reach an optimum temperature for eating. The bread produced according to the present invention can withstand such heating and resumes back its original quality including texture, taste and flavor which are comparable to that of freshly baked bread.

In another aspect, the present invention provides a dough formulation for making microwave heatable bread for fast food comprising wheat flour containing at least 30 weight % of hard white wheat flour, a leavening effective amount of yeast, 0.1 to 1.0% by weight of the flour of rice koji, 0.0005 to 0.05% by weight of the flour of vitamin C and appropriate amounts of other conventional additives such as sodium chloride, sugar, oil and fats and milk powder, the dough formulation being free of yeast food, potassium bromate and an emulsifier. After leavening and freezing, the dough may be stored or shipped for making microwave heatable bread for fast food.

In a further aspect, the present invention provides a bakery flour premix consisting essentially of wheat flour containing at least 30% weight % of hard white wheat flour, 0.1 to 1.0% by weight of the flour of rice koji and 0.0005 to 0.05% by weight of the flour of vitamin C. The premix is used for making microwave heatable bread for fast food using the conventional bakery process in the absence of yeast food or potassium bromate and an emulsifier after the addition of appropriate amounts of yeast and other conventional additives.

DESCRIPTION OF PREFERRED EMBODIMENTS

The starting wheat flour used for making microwave heatable bread according to this invention contains hard white wheat flour at least partially. Conventionally, hard red wheat flour has been used for bakery purposes while hard white wheat flour has been used mainly for noodles either alone or in combination with hard red wheat flour. Recently, consumption of hard white wheat flour is increasing for bakery purposes. It is known that hard white wheat (HWW) flour is brighter than hard red wheat (HRW) flour and the pulverized whole grains of HWW is less bitter than that of HRW. It is also known that the properties of HWW flour are acceptable also for bakery purposes. Accordingly, the total cultivating areas of HWW are increasing in Kansas and other states.

It is known that HWW gluten is different from HRW gluten in rheological properties. This difference is noticeable when comparing the extensographs of dough having a cylindrical shape made from respective flour taken after a predetermined floor time. In this comparison, the dough made from HWW flour exhibits lower elongation and tensile strength than the dough made from HRW flour at the same gluten content. This demonstrates that the network structure of the dough made from HWW flour is less strong than that of the dough made from HRW flour. A finer and uniform network structure is achieved in the dough by replacing HRW flour at least partically with HWW flour and adding rice koji and vitamin C instead of yeast food or potassium bromate and an emulsifier to the dough. It is postulated that water contained in the dough is present mostly in bound form which will hardly develop into needle ice crystals in the frozen dough and thus the frozen dough or bread made therefrom is less susceptible to destruction of the network structure upon microwave heating. The proportion of HWW flour in the starting flour material is preferably at least 30%, more preferably at least 70% in order to achieve microwave heatability. The balance is HRW flour.

The dough formulation according to this invention includes, in addition to HWW flour, rice koji and vitamin C instead of yeast food or potassium bromate and an emulsifier. Yeast food and potassium bromate have been regarded essential in the conventional bakery process as fermentation promoter and as bread improving agent, respectively. Emulsifiers such as fatty acid glycerides are also regarded essential in the conventional bakery process in order to achieve homogeneous dispersion of lipophilic shortening in hydrophilic wheat flour and to prevent oxidative aging of starch in the bread. The use of these agents may be dispensed with by the use of rice koji and vitamin C according to this invention.

Rice koji is a culture of *Aspergilus oryzae* produced by inoculating steamed white rice with conidium of the mold and culturing the inoculum to produce mycelium. Rice koji has long been used in Japan for the production of a variety of fermentation products such as Japanese sake, sweet sake, soy sauce or the like. Rice koji is abundant in amylase, protease and lipase which produce unique taste and flavor in the respective fermentation products. When rice koji is added to dough in conjunction with yeast, its enzyme activities promote not only the fermentation by yeast but formation of gluten to achieve satisfactory texture and taste in the finished bread. Vitamin C (ascorbicacid or a salt thereof) promotes the formation of disulfide linkage in the dough to improve the gas-retainability and elasticity thereof.

The amount of rice koji and vitamin C in the dough in terms of percents by weight of wheat flour are from 0.1 to 1.0%, preferably from 0.2 to 0.5% for rice koji, and from 0.0005 to 0.05%, preferably from 0.001 to 0.01% for vitamin C. The dough according to this invention may be produced by adding an effective amount of yeast and other additives such as sodium chloride, sugar, oil and fats and milk powder to the flour material containing rice koji and vitamin C and kneading the mixture with water. The nature and amounts of these other additives are well known in the art.

Except the dough formulation as described above, the bakery process may be otherwise conventional. Namely, either sponge dough process or direct process may be employed as the bakery process.

The finished bread thus produced is particularly suitable for the preparation of microwave heatable bread-based fast food such as hot dogs or hamburgers. To this end, the finished fast food may be wrapped with a microwave heatable packaging material and then stored or shipped in refrigerated or frozen stage for heating in a microwave heater at home or in restaurants or shops or automated vending machines having a self-contained microwave heater to an optimum temperature without damaging the quality of bread. Alternatively, the bread may be shipped as a frozen semi-finished product that has been baked to a state in which dextinized starch will remain as such after freezing. Final baking of this semi-finished product may conveniently be completed at home or in restaurants or shops by baking the semi-finished bread using an oven. The packaging materials for wrapping finished fast food or semi-finised bread according to this invention must withstand or are adapted for microwave heating. Plastic laminates adapted for microwave heating are preferable for packaging the products to be sold by automated vending machines having a self-contained microwave heater in particular since the products are rapidly heated from frozen state to an elevated temperature.

Finally, it would be convenient to provide a flour premix for making the microwave heatable bread or fast food as describe above at home or in bakery shops. Such a premix consists essentially of wheat flour, at least 30% of which being hard white wheat flour and the balance being hard red wheat flour, from 0.01 to 1.0% by weight of the flour of rice koji, and from 0.0005 to 0.05% by weight of the flour of vitamin C. The flour premix may optionally contain an effective amount of yeast for leavening.

EXAMPLES

The following examples are offered for illustrative purpose only and not for limitative purposes. All percents therein are by weight unless otherwise indicated.

Example 1

Buns were produced from hard white wheat flour (Kansas, 12% protein and 14% moisture contents) by the sponge dough process using the following formulations and steps.

| A. Sponge dough formulation | |
|---|---|
| Hard white wheat flour | 700 g |
| Yeast | 20 g |
| Rice koji | 4 g |
| Vitamin C | 0.04 g |
| Water | 400 g |
| B. Steps | |
| Mixing | |
| Low speed | 2 min. |
| High speed | 2 min. |
| Mixing temperature | 24–25° C. |
| Fermentation time | 4 hours at 27° C. at 75% R.H. |
| C. Main dough formulation | |
| Hard white wheat flour | 300 g |
| Sugar | 120 g |
| Oil and fats | 80 g |
| Sodium chloride | 20 g |
| Skim milk | 20 g |
| Water | 220 g |
| Sponge dough | as above |
| D. Steps | |
| Mixing | |
| Low speed | 3 min. |
| High speed | 7–8 min. |
| Mixing temperature | 27–28° C. |
| Floor time | 15 min. |
| Divided amount | 80 g |
| Bench time | 15 min. |
| Shaping | Rolls using a molder |
| Final proofer | 45 min. at 37° C at 85% R.H. |
| Baking | 10 min. at 210° C. |

The resulting buns were held at 5 to 10° C. for 48 hours and then heated in a 1500 W microwave heater for 15 seconds. Volumetric shrinkage was not observed and the buns were as tasteful as freshly baked buns produced from a dough containing yeast food or potassium bromate and an emulsifier instead of rice koji and vitamin C. In the same test, commercially available buns exhibited remarkable volumetric shrinkage and surface wrinkles and the interior texture thereof turned too soft and sticky and, then solidified with time.

Example 2

Rolls were produced from a 7:3 mixture of Australian hard white wheat flour (12.5% protein and 14% moisture contents) and hard red wheat flour (U.S.A., 13% protein and 14% moisture contents) by the direct bakery process using the following formulation and steps.

| A. Formulation | |
|---|---|
| HWW flour | 700 g |
| HRW flour | 300 g |
| Yeast | 20 g |
| Rice koji | 4 g |

-continued

| | |
|---|---|
| Vitamin C | 0.04 9 |
| Sugar | 100 g |
| Oil and fats | 50 g |
| Sodium chloride | 20 g |
| Skim milk | 20 g |
| Water | 230 g |

B. Steps

Mixing

| | |
|---|---|
| Low speed | 4 min. |
| High speed | 6–7 min. |
| Mixing temperature | 27–28° C. |
| Fermentation time | 2 hours |
| Divided amount | 80 g |
| Bench time | 15 min. |
| Shaping | Rolls using a molder |
| Final proofer | 45 min. at 37° C. at 85% R.H. |
| Baking | 10 min. at 210° C. |

The resulting rolls were held at room temperature (20° C. for 24 hours and then heated in a 1500 W microwave heater for 12 seconds. Volumetric shrinkage was not observed and the rolls were as tasteful as freshly baked rolls produced from a dough containing yeast food or potassium bromate and an emulsifier instead of rice koji and vitamin C. In the same test, commercially available rolls led to the same results as observed in Example 1.

Example 3

Buns produced in Example 1 (70 g each) were combined with beef hamburg steak (42 g each) together with sliced onion (8 g each) and catsup (10 g each) to obtain hamburgers (130 g each). The resulting hambergs were wrapped with a microwave heatable polyethylene film and then held in frozen state at −25° C. for 1 week. The frozen hamburgers were thawn and heated in a 1500 W microwave heater for 70 seconds. The bread part substantially resumed back its original state in the surface and interior portions while some amount of water was transferred from catsup and other inserts to the bread. The entire hamburgers were, however, as tasteful as those freshly prepared.

Example 4

Rolls produced in Example 2 (70 g each) were combined with pork sausage (62 g each) together with mustard paste (8 g each) and catsup (12 g each) to prepare hot dogs. The resulting hot dogs were wrapped with a microwave heatable polyethylene film and then held in refrigerated state for 3 days at 5° C. The refrigerated hot dogs were heated in a 1500 W microwave heater for 30 seconds. The bread part substantially resumed back its originally state in the surface and interior portions while some amount of water was transferred from catsup and other inserts to the bread. The entire hot dogs were, however, as tasteful as those freshly prepared.

Example 5

The bread dough prepared in Example 2 was frozen at −25° C. after final proofer but before final baking and held in frozen state for 30 days. The frozen dough was then thawn and finished into baked rolls by baking in an bakery oven at 210° C. for 10 minutes. The resulting rolls are cooled to room temperature and re-heated in a 1500 W microwave heater for 12 seconds. Volumetric shrinkage was not observed in the re-heated rolls and their taste and flavor were substantially as same as those prepared in Example 2.

Example 6

Example 1 and Example 2 were repeated using a flour premix containing rice koji and vitamin C in corresponding amounts. The same results were obtained as these examples.

What is claimed is:

1. A method for serving customers with bread-based fast food products while hot comprising:

producing bread from dough comprising wheat flour wherein 30 weight % at least being hard white wheat flour; yeast from 0.1 to 1.0% by weight of the flour of rice koji and from 0.0005 to 0.05% by weight of the flour of vitamin C, said dough being free from yeast food, potassium bromate and emulsifiers;

storing said bread in a cooled, refrigerated or frozen state together with a meat product inserted therein;

heating said bread in a microwave heater until said meat product reaches an optimum temperature for eating.

2. The method according to claim 1, wherein said wheat flour consists essentially of from 30 to 100% of said hard white wheat flour and the balance of hard red wheat flour.

3. The method according to claim 2, wherein said dough contains a leavening effective amount of yeast.

4. The method according to claim 3, wherein said dough further contains sodium chloride, sugar, oil fats, or milk powder.

5. The method according to claim 1, wherein said dough is leavened, shaped and baked to obtain finished bread in the form of buns or rolls.

6. The method according to claim 1, wherein said wheat flour consists essentially of from 50 to 100% of said hard white wheat flour and the balance of hard red wheat flour.

7. The method according to claim 1, wherein said wheat flour consists essentially of 100% of said hard white wheat flour.

* * * * *

UNITED STATES PATENT AND TRADEMARK OFFICE
CERTIFICATE OF CORRECTION

PATENT NO.     : 6,623,777 B2
DATED          : September 23, 2003
INVENTOR(S)    : Katsunori Kawase and Seiki Harada It is certified that error appears in the above-identified patent and that said Letters Patent is hereby corrected as shown below:

<u>Title page,</u>
Item [73], Assignee, should read -- Unicolloid, Inc. --

Signed and Sealed this

Twenty-second Day of June, 2004

JON W. DUDAS
*Acting Director of the United States Patent and Trademark Office*